Oct. 11, 1949.  A. SEARLES  2,484,752
RENEWABLE RESILIENT IDLER UNIT
Filed May 24, 1945  2 Sheets-Sheet 1
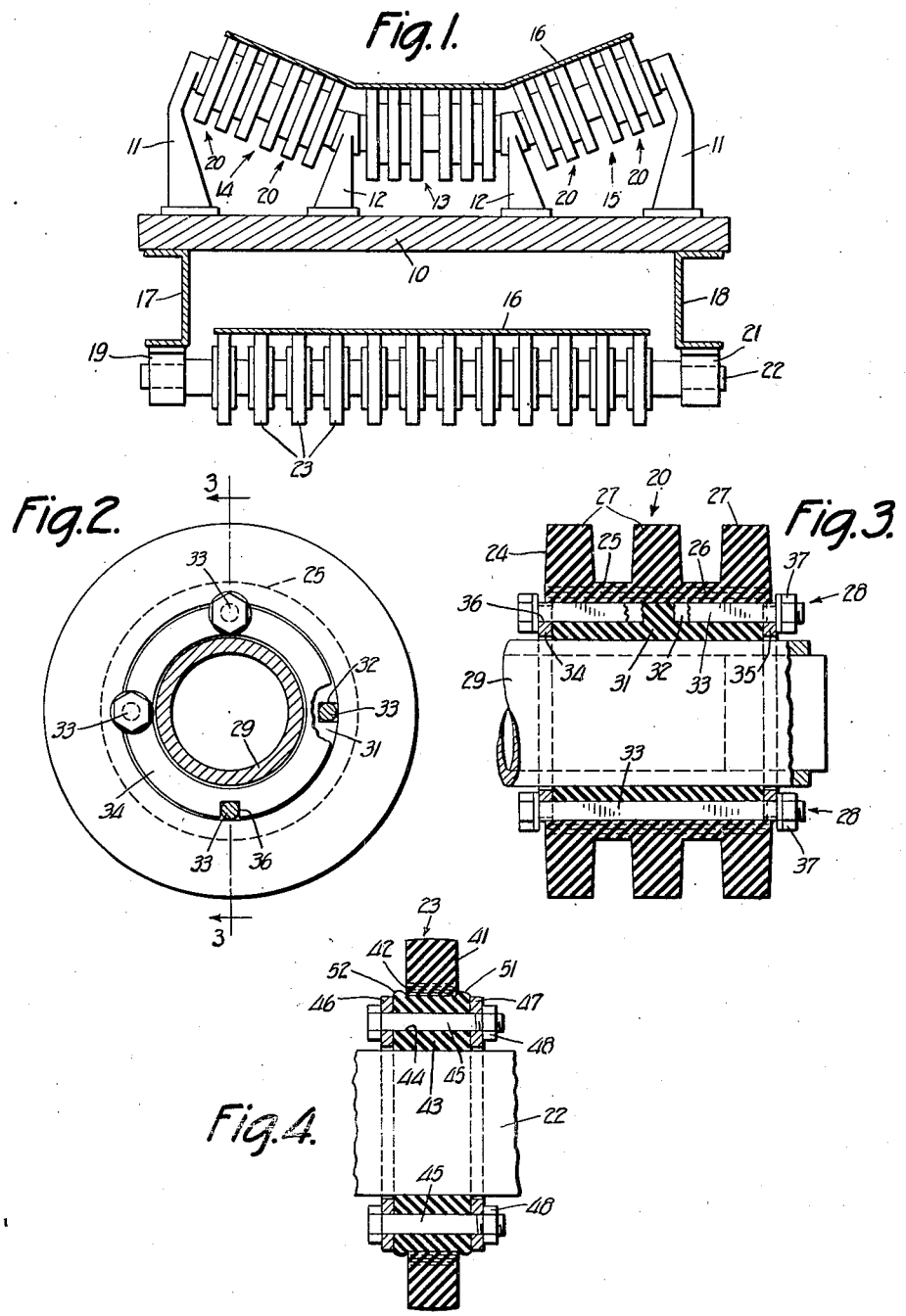
INVENTOR.
Amos Searles
BY
Moses, Nolte, Crews & Berry
ATTORNEYS Oct. 11, 1949.  A. SEARLES  2,484,752
RENEWABLE RESILIENT IDLER UNIT
Filed May 24, 1945  2 Sheets-Sheet 2

INVENTOR.
Amos Searles.
BY
Moses, Nolte, Crews & Berry
ATTORNEYS

Patented Oct. 11, 1949

2,484,752

UNITED STATES PATENT OFFICE 2,484,752

RENEWABLE RESILIENT IDLER UNIT

Amos Searles, Moscow, Pa.

Application May 24, 1945, Serial No. 595,609

4 Claims. (Cl. 74—230.5)

This invention relates to idler units for belt conveyor mechanism and more particularly to the construction of the roller elements therefor.

Heretofore, the roller elements for conveyor return idler units have been made by assembling or slipping resilient molded discs or solid rubber treads upon a supporting tube or idler shaft. This assembling could only be done with special shop facilities. To insure a tight grip of the discs or rubber treads on the supporting tube and prevent their displacement in operation, these treads have been provided with wire and fabric reinforcement near their inner diameter. In the course of time, discs or treads become worn and replacement is necessary in the field. This replacement in the field cannot be readily done since the shop facilities are not always available. Consequently, the roller element had to be returned to the manufacturer for repairs. Further, when this replacement was made, considerable portions of the original disc or tread are scrapped.

In another form, resilient tread rings or rubber sleeves are retained between two metal retaining flanges or plates and at least one of the retaining flanges of each assembly welded to the idler shaft to prevent its axial displacement. The wearable portion was limited by the flanges. This, too, makes an awkward construction from the point of view of replacement. Thus, in both forms, large portions of the tire or sleeve material are wasted on replacement. The large hub portions containing the bulk of the material are discarded when the treads are worn down to the same.

It is among the objects of the present invention to provide a roller element for conveyor idler units with a low cost renewable tread having minimum unwearable discard, and one in which portions of the original roller element constituting the hub thereof can be retained, and to cut down on the cost of maintenance of such units.

It is another object of the invention to provide a roller element wherein the forcing of the element into and out of position on the supporting shaft is eliminated.

According to the invention, the individual roller element comprises a removable tread and a central supporting or gripping structure which can be repeatedly used to connect the treads to the supporting tube or idler shaft. Two general forms of the invention are provided.

In one form the gripping structure comprises a resilient or deformable sleeve with holes therein for receiving clamping bolts, clamping plates at the opposite ends of the sleeves adapted to be axially brought together by the clamping bolts to compress the deformable sleeve axially and cause the same to be forced radially inwardly and outwardly to grip both the tread element and the supporting tube, thereby to lock the tread against both radial and axial displacement. The deformable sleeve can be either the same length as the tread or somewhat longer. In the latter instance, upon tightening the clamping device bulges are formed at the ends of the sleeve which positively lock the tread to the sleeve against axial displacement.

In the other form, no clamping plates or bolts are needed. The connecting sleeve is of similar deformable material but is formed with an inner diameter, smaller than the diameter of the idler shaft and with an outer diameter so as to fit the inner diameter of the tread element, so that when the combined deformable connecting sleeve and resilient tread element are forced over the supporting tube together and moved into its proper axial position thereon, the connecting sleeve material is compressed radially, exerting radial forces to fix the tread element to the connecting sleeve and the sleeve to the shaft. The connecting sleeve is positioned within the tread element before the assembly is forced over the supporting tube.

For other objects and for a better understanding of the invention, reference may be had to the following detailed description, taken in connection with the accompanying drawing, Fig. 1 is a transverse section of a conveyor mechanism employing the roller elements of the present invention;

Fig. 2 is an enlarged end view of one of the roller elements shown on the upper roller support of the idler unit shown in Fig. 3;

Fig. 3 is a fragmentary side view, partly in section, taken on line 3—3 of Fig. 2, of one of the upper roller elements assembled to a supporting tube;

Fig. 4 is a vertical section of one of the roller elements shown on the lower roller structure, where a single tread is shown and where the resilient connection of sleeve is longer than the tread;

Figure 5:
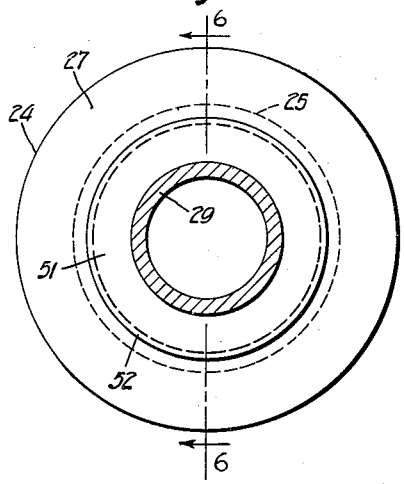
Fig. 5 is an end view of a modified form of roller element which utilizes only the resilient sleeve to affix the tread element to the idler shaft.

Referring now to Fig. 1, 10 is a base, which carries opposing vertical supports 11, 12 formed at their head ends to accommodate a central roller structure 13 and two outer roller structures 14, 15. The outer roller structures are disposed at an upwardly inclined angle to cause the conveyor belt 16 passing thereover to assume a trough shape and better contain the material being conveyed.

A roller structure includes channel pieces 17 and 18 secured to the ends of the base 10 and respectively carrying on their bottom flanges, bearing blocks 19, 21 in which idler shaft 22 is supported. This shaft 22 carries several lower roller elements 23. The roller elements 23 are axially aligned and flatly support the return portion of conveyor belt 16.

Referring now to Figs. 2 and 3, a single roller 20 such as is used on the upper roller structures 13, 14, 15 is shown. Two or more of these rollers 20 are utilized for each structure.

These rollers 20 include a tread element 24 having a base portion 25 with fabric or wire reinforcement 26 therein and two or more treads 27. The reinforcement is inextensible in order that the tread will not be expanded radially and flexible to conform to the forces set up in the rubber. This tread element receives considerable wear from the conveyor belt 16 and eventually the treads 27 become worn down to the reinforced base portion 25. When this takes place it is desired that the tread elements 24 be replaced with another tread element.

The roller element 20 further includes means, indicated generally at 28, for connecting the tread element 24 to an idler shaft 29. This connecting means comprises a resilient or deformable sleeve 31 having a series of circumferentially-spaced axially extending grooves 32 in its outer face for receiving clamping bolts 33. Clamping plates 34, 35 are respectively disposed at opposite ends of the sleeve 31 and the clamping bolts pass through openings 36 thereof registering respectively with the grooves 32 of the sleeve 31. As the clamping bolts 33 are tightened by nuts 37 thereon the plates 34, 35 are brought against the ends of the sleeve 31 to compress the sleeve 31 axially. This action causes the deformable material thereof to be forced radially inwardly and outwardly and grip shaft 29 and tread element 24. As long as the clamping bolts 33 remain tight the tread element is secured through the sleeve 31 to the idler shaft 29.

After the tread element 24 has become worn, it may be replaced with another tread element 24. To accomplish this, the idler shaft 29 is removed from supports 11, 12, the clamping nuts 37 are loosened, and the assemblies slid off the shaft 29. The unrestrained dimensions of the sleeve 31 are such as to permit the easy removal of the sleeve 31 from the shaft 29 and the tread element 24 from the sleeve 31. A new tread element is placed on the sleeve and both are assembled to the shaft. Clamping nuts 37 are then affixed to their bolts 33 and tightened to again compress the rubber sleeve 31 and thereby connect the new tread element to shaft 29, in the same fashion that the old tread element 24 had been connected. If desired, the bolts 33 may have nut 37 on each end, so that the tread can be removed from either end of the sleeve 31.

The roller structure 23 shown in Fig. 4 used on a lower shaft 22, differs from the roller structure shown in Figs. 2, 3, not only in the length of the tread element but in the axial length of the deformable sleeve. The sleeve extends beyond the end faces of the tread element so that upon being axially compressed to clamp the tread element to the shaft, bulges are formed at the opposite ends of the sleeve. The bulges will positively lock the tread element against axial displacement on the deformable sleeve.

In this form, 41 is a single tread element having fabric reinforcement 42 and 43 is the deformable sleeve which is longer than the tread element 41. The sleeve 43 has openings 44 extending therethrough at points intermediate the inner and outer peripheries thereof. These openings 44 contain bolts 45. At the opposite ends of the sleeve are disposed clamping plates 46, 47. The bolts 45 extend through these clamping plates and when tightened by nuts 48, the deformable sleeve 43 is compressed so as to radially grip the shaft 22 and the tread element 41. Since the sleeve 43 is longer axially than the tread element 41, bulges 51 and 52 are formed on the opposite ends of the sleeve. These bulges positively lock the tread element against axial displacement. When it is desired to remove the tread element 41, the clamping nuts 47 are loosened. The sleeve 43 is thus permitted to expand axially and release its grip upon the shaft 22 and tread element 41. The bulges 51 and 52 disappear. The tread element 41 can then be easily replaced with a new or unworn tread element 41.

Figure 6:
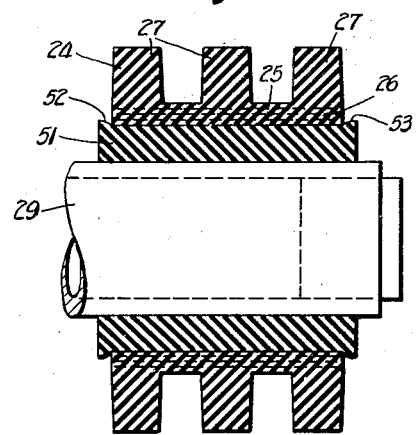
Fig. 6 is a cross-sectional view taken on line 6—6 of Fig. 5, showing this modified roller element in its assembled position upon a supporting tube.

Referring now to Figs. 5 and 6, there is shown a form of the invention in which no clamping plates or clamping bolts are needed to effect the clamping action of the resilient sleeve.

The tread element 24 is constructed similarly to the above mentioned tread elements shown in Figs. 2, 3 and thus similar numbering pertaining thereto will be used. The element has the usual reinforced base portion 26 and treads 27. A deformable connecting sleeve 51 in its free state has an inner diameter less than the diameter of the shaft 29 and an outer diameter to fit the inner diameter of the tread element 24.

To assemble the arrangement to the shaft, the sleeve 51 is first fitted into the tread element 24 and then slid with the tread element over the shaft 29. The sleeve then assumes the shape shown in Fig. 6 whereby to effect a gripping action upon both the tread element and the shaft 29. Since the sleeve 51 is longer than the tread element, bulges 52 and 53 are formed thereon due to the confined portions thereof being radially contracted. These bulges, like in the other form, Fig. 4, above described, positively prevent axial displacement of the tread element 24 with respect to the sleeve 51.

When it is desired to remove the tread element 24, the shaft 29 containing the same is taken from the brackets and with little effort the roller structures are pressed from the shaft 29. The new tread element 24 is then assembled to the sleeve 51 and the sleeve with the tread element forced on the shaft 29.

Figure 7:
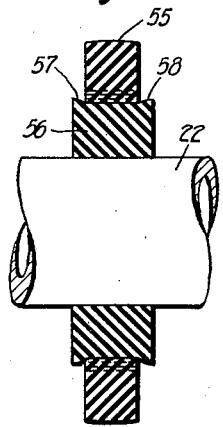
Fig. 7 is a cross-sectional view, in elevation, of a roller element similarly using only the deformable sleeve but with a single tread element.

In Fig. 7, a tread element 55 of short axial length such as shown on the lower roller structure of the idler unit, is secured to shaft 22 by a deformable sleeve 56 formed of the similar diametrical dimensions as the above sleeve 51, but only of such length as to accommodate the short tread element 55. Locking bulges 57, 58 are likewise formed in this construction.

It will be understood that multiple tread unit structures may be used on the return idler shaft 22 in lieu of the single tread unit structures.

I have described what I believe to be the best embodiments of my invention. I do not wish, however, to be confined to the embodiment shown, but what I desire to cover by Letters Patent is set forth in the appended claims.

I claim:

1. In an idler roller structure for a conveyor mechanism, a rotary idler shaft, bearing supports for the shaft in which the shaft is freely rotatable, a separable deformable tread portion, deformable connecting means disposed between the tread and the idler shaft and directly engaged with the tread and the shaft but spaced from the bearing supports for securing the tread to the shaft, said connecting means extending the full axial length of the tread portion and projecting beyond each end of the tread portion, the tread portion exerting radial gripping action upon the connecting means and the connecting means exerting radial gripping action upon both the tread and the shaft and providing locking bulges on the projected ends to positively prevent axial displacement of the tread portion relative to the connecting means and to the shaft.

2. In combination, a roller structure comprising a shaft, bearing supports for the shaft in which the shaft is freely rotatable, a deformable tread portion on the shaft and a deformable retaining sleeve for fixing the tread portion to the shaft, directly engaged with the tread portion and the shaft but spaced from the bearing supports, said sleeve having in its free state an internal diameter less than the diameter of the shaft and an outer diameter to fit the inner diameter of the tread portion, but compressed as assembled to the shaft and tread portion, the tread portion exerting radial gripping action upon the retaining sleeve and the retaining sleeve exerting radial gripping pressure upon the shaft and tread portion, said sleeve being longer than the tread portion and extending beyond the opposite ends of the tread portion whereby to provide bulges on the end extensions when the parts are assembled so as to positively lock the tread portion against axial displacement relative to the sleeve and the shaft.

3. In an idler structure for a conveyor mechanism, an idler element shaft, bearing supports for the shaft in which the shaft is freely rotatable, a separable tread portion of resilient material with a flexible and inextensible reinforcement therein near its inner boundary to give rigidity in that region thereof, and deformable connecting means disposed between and directly engaged with the tread portion and the idler shaft but spaced from the bearing supports for securing the tread portion in fixed relation to the shaft, the tread portion exerting radial gripping action upon the connecting means and said connecting means exerting radial gripping action upon both the tread, near its inner boundary, and the shaft.

4. In an idler structure for a conveyor mechanism, an idler element shaft, bearing supports for the shaft in which the shaft is freely rotatable, a separable tread portion of resilient material with a flexible and inextensible reinforcement therein near its inner boundary to give rigidity in that region thereof, and a deformable connecting sleeve disposed between the tread portion and the idler shaft but spaced from the bearing supports for securing the tread portion to the shaft, said connecting sleeve extending the full axial length of the tread portion and projecting beyond each end of the tread portion, the tread portion exerting radial gripping action upon the connecting sleeve and the connecting sleeve exerting radial gripping action upon both the tread and the shaft, and providing locking bulges on the projecting ends to positively prevent axial displacement of the tread portion relative to the connecting means and to the shaft.

AMOS SEARLES.

REFERENCES CITED

The following references are of record in the file of this patent:

UNITED STATES PATENTS

| Number | Name | Date |
| --- | --- | --- |
| 1,541,276 | Powell | June 9, 1925 |
| 1,928,763 | Rosenberg | Oct. 3, 1933 |
| 2,224,478 | Jones | Dec. 10, 1940 |
| 2,423,407 | Searles et al. | July 1, 1947 |

OTHER REFERENCES

Ser. No. 415,056, Piot (A. P. C.), published June 1, 1943.